United States Patent [19]

Koskan

[11] Patent Number: 5,057,597

[45] Date of Patent: Oct. 15, 1991

[54] PROCESS FOR THE MANUFACTURE OF ANHYDRO POLYAMINO ACIDS AND POLYAMINO ACIDS

[76] Inventor: Larry P. Koskan, 8617 Golfview Dr., Orland Park, Ill. 60462

[21] Appl. No.: 547,875

[22] Filed: Jul. 3, 1990

[51] Int. Cl.$^5$ .............................................. C08G 69/10
[52] U.S. Cl. .................................... 528/328; 525/419; 525/420; 528/499
[58] Field of Search ................ 528/328, 499; 525/419, 525/420

[56] References Cited

U.S. PATENT DOCUMENTS 3,052,655 9/1962 Fox et al. ............................ 528/328

FOREIGN PATENT DOCUMENTS 641493 5/1962 Canada.

Primary Examiner—Harold D. Anderson
Attorney, Agent, or Firm—Dressler, Goldsmith, Shore, Sutker & Milnamow, Ltd.

[57] ABSTRACT

A process for the manufacture of polyamino acids, particularly polyaspartic acid. A solid, particulate, amino acid is fluidized by agitation in a nitrogen atmosphere and heated to a temperature of at least 180° C. and maintained at that temperature for a sufficient amount of time to polymerize the amino acid and to drive off water from the heated bed. A degree of agitation sufficient to substantially fluidize the particles is provided and a particle size of no more than 150 microns is maintained throughout the process. The resultant anhydropolyamino acid is then hydrolyzed to a polyamino acid.

8 Claims, No Drawings 5,057,597

PROCESS FOR THE MANUFACTURE OF ANHYDRO POLYAMINO ACIDS AND POLYAMINO ACIDS

TECHNICAL FIELD

The present invention relates to a process for the manufacture of polyamino acids, preferably polyaspartic acid.

BACKGROUND OF THE INVENTION

Polyamino acids such as polyaspartic acid (PAA) are useful in fertilizers, as scale inhibitors, and scale deposit removers. Polyamino acids have been synthesized by thermal polycondensation reactions. Unfortunately, the known methods for the synthesis of polyamino acids are complex, expensive and provide low product yields.

A method for the polycondensation of aspartic acid in solid form is disclosed in E. Kokufuta et al., "Temperature Effect on the Molecular Weight and the Optical Purity of Anhydropolyaspartic Acid Prepared by Thermal Polycondensation", *Bul. Chem. Soc. Japan*, 61(5):1555-1556 (1978). The polycondensation reaction described therein requires heating solid L-aspartic acid to 160° to 220° C. for five hours. The product, anhydropolyaspartic acid (APAA), is then dialyzed for five to six days. Weight losses during the dialysis step range from 97% to 29%. The highest yield of APAA achieved by the Kokufuta et al. process is 50% by weight of APAA based on the starting weight of the aspartic acid at a reaction temperature of 220°.

Another method for the synthesis of polyaspartic acid is disclosed in Boehmke, U.S. Pat. No. 4,839,461. This process combines maleic acid or maleic anhydride and an ammonia solution in a molar ratio of 1:1-1.5. The mixture is then heated to 120°-150° C. and the resulting solution of ammonium salt and maleic acid is evaporated, leaving a crystal mash. The crystal mash is then melted, during which time the water of condensation and crystallization distill off. A porous mass of polyaspartic acid results. The entire process requires six to eight hours to complete.

The prior art methods for the synthesis of polyamino acids are time consuming and complex. It is an object of this invention to provide a relatively simple process for the manufacture of polyamino acids that results in a high percentage conversion of amino acid to polymer.

SUMMARY OF THE INVENTION

A process for the manufacture of a polyamino acid, preferably polyaspartic acid, in relatively high yields is disclosed wherein a freely flowing, solid, particulate, amino acid is agitated sufficiently to form a fluid bed of the amino acid. The fluid bed is heated to a temperature of at least about 180° C. (356° F.) and maintained at a temperature in the range of about 180° C. (356° F.) to about 250° C. (482° F.) for a time period sufficient to polymerize the amino acid and to drive off water from the heated bed while maintaining a mean particle size of no more than 150 microns. The degree of agitation provided is at least sufficient to maintain the particles in a substantially free-flowing state throughout the requisite time period. An anhydropolyamino acid results.

The resultant solid product contains a high percentage of polymerized amino acid, heretofore not achieved by prior art processes that utilize thermal polycondensation reactions. The process provides yields of anhydropolyamino acid in excess of 95% of theoretical, based on the starting weight of polyamino acid.

The anhydropolyamino acid is then hydrolyzed, preferably using alkaline hydrolysis.

DESCRIPTION OF THE PREFERRED EMBODIMENT

The process disclosed herein utilizes a thermal polycondensation reaction to manufacture polyamino acids, preferably polyaspartic acid. While the present invention is susceptible of embodiment in various forms, there is hereinafter described presently preferred embodiments, with the understanding that the present disclosure is to be considered as an exemplification of the invention and is not intended to limit the invention to the specific embodiment illustrated.

The process utilizes a thermal polycondensation reaction to produce an anhydropolyamino acid from an amino acid. The process utilizes heat and shear forces in the form of mechanical agitation to drive water from the amino acid particles, causing them to condense and polymerize. A typical polycondensation reaction polymerizes an amino acid to form an anhydropolyamino acid by driving water from the amino acid as it polymerizes. For example, aspartic acid, when it is subjected to heat and shear, polymerizes to form APAA. Theoretically, every molecule of aspartic acid that is polymerized yields two molecules of water. Therefore, if the aspartic acid is entirely polymerized, the theoretical product yield is 74% by weight APAA and 26% water based on the starting weight of aspartic acid.

The process utilizes conventional equipment that is commercially available to provide the mechanical shear forces and heat required to manufacture polyamino acids. A fluid bed dryer that provides both mechanical shear and heat has proven suitable for use in this process. It would be apparent to one skilled in the art, however, that any type of processing equipment capable of providing the process conditions herein described would be suitable for use in the disclosed process.

An amino acid (110 lbs) such as, for example, L-aspartic acid is charged into a fluid bed dryer such as, for example, a model FM-130 Laboratory Mixer obtained from Littleford Bros., Inc. The amount of amino acid depends upon the capacity of the equipment used. The amino acid is added in solid, particulate form. The fluid bed dryer is equipped with an agitator which, preferably, has plow-shaped blades to provide maximum fluidization of the particles in the bed. The fluid bed dryer is also equipped with a chopper to break up any lumps or clumps of particles that develop and to provide additional shear forces to the fluid bed. Sufficient mechanical shear should be provided to optimize fluidization of the particles in the bed. At least about 0.015 horsepower per hour per liter of total dryer capacity is estimated to be required to adequately fluidize the particles in the bed. This is based on utilizing a fluid bed dryer with a 130 liter total capacity. Increasing the shear forces applied was observed to increase the yield obtained from the process.

The fluid bed dryer is also equipped with a heating means such as a heat jacket which provides heat for the condensation polymerization of the amino acid. The dryer is preheated to a jacket temperature of about 180° to 260° C. (356° to 500° F.). The jacket temperature is maintained at a temperature sufficient to ensure that the particles in the bed are maintained at a temperature of about 180° to 250° C. (356° to 482° F.). This temperature is referred to herein as the product temperature. The preferred reaction temperature is approximately 221° C. (430° F.). The temperature is maintained at the desired level over the course of the reaction, approximately three to six hours.

The dryer is also equipped with a vent and a stack. The stack has a filter therein. Stack gas exits the dryer through a filter, which collects any solid particles entrained therein. The stack ga then flows to a condenser where the moisture therein is collected and measured. The progress of the polymerization can be monitored by observing the amount of water recovered from the dryer stack. As the reaction proceeds, the amount of water condensing from the stack gas is observed to decrease. When the rate of condensation decreases significantly, the reaction is nearing complete polymerization. Typically, the reaction will take place over the course of three to six hours.

The reaction optionally takes place in a nitrogen atmosphere. Nitrogen gas is provided to the fluid bed dryer at atmospheric pressure from a conventional nitrogen source such as a nitrogen gas cylinder.

The resultant anhydropolyamino acid is then hydrolyzed by alkaline hydrolysis to produce a polyamino acid. The alkaline hydrolysis is conventional. A suitable method is disclosed in Kovacs, J. et al., *J. Org. Chem.*, 26:1084 (1961).

The following examples are embodiments of the general process discussed hereinabove and are intended by way of illustration only. These examples are not intended to limit the invention in any way, other than in the spirit and scope of the appended claims. In all of the examples below, the Littleford fluid bed dryer described hereinabove was used.

EXAMPLE 1

L-aspartic Acid (110.5 lbs.) was placed in the preheated fluid bed dryer. An atmosphere of nitrogen was introduced into the dryer. The jacket had been preheated to 260° C. (500° F.). Agitation of the particles was commenced immediately to fluidize the particles in the dryer. The product temperature reached 204° C. (400° F.) within the first hour. Condensation was observed as the stack gas from the dryer passed through the condenser. The product temperature dropped from 204° C. (400° F.) to 200° C. (393° F.) approximately two hours after the aspartic acid was charged into the dryer. The product temperature then increased to 218° C. (424° F.) although the jacket temperature remained constant. The temperature of the product remained constant until about the third hour of the reaction where a slight increase to 224° C. (436° F.) was observed. The reaction temperature remained constant at 223° C. (434° F.). The amount of condensate from the stack gas was observed to decrease at this time.

After three hours, the nitrogen gas flow was stopped and the product was removed from the dryer. The weight of product recovered from the dryer was 83 pounds. The weight of solid product removed from the filter was 10 pounds and the weight of condensate recovered was 12.8 pounds. The average particle size of the product was 50 microns. The product was analyzed and determined to be 74% APAA. Based on 74% polymerization, the yield was 84% of theoretical.

The agitator, which was equipped with a 10 hp motor and plow-type blades, rotated at a speed of 155 rpm. The agitator utilized was conventionally available for use with the fluid bed dryer used, and required no special modifications. Approximately 2600 watts of power was initially supplied to the agitator, but this was reduced to 1650 watts after the first hour of reaction time and held steady throughout the remainder of the reaction. The horsepower per hour, based on three hours of reaction time, was 2.35. Based on the total fluid capacity of the fluid bed dryer being 130 liters, the horsepower per hour per liter volume was 0.018.

EXAMPLE 2

L-aspartic acid (110.5 lbs.) was introduced into a fluid bed dryer with the jacket preheated to 260° C. (500° F.). An atmosphere of nitrogen was introduced into the dryer, and agitation of the contents using an agitator as described in Example 1, rotating at a shaft speed of 155 rpm, was commenced. For increased agitation, a chopper was utilized. The chopper was equipped with a 10 hp motor and was run at full speed. The chopper utilized was commercially available with the dryer used and required no modification.

The product temperature reached 204° C. (400° F.) in 30 minutes. The product temperature was maintained at 222° C. (431° F.) for the remaining hour of the three hour and 30 minute reaction time. The jacket temperature remained constant throughout the process, and the reaction temperature was maintained at 222° C. (431° F.).

The recovered product weighed 80.8 pounds. The product recovered from the filter weighed 0. pounds and the condensate recovered weighed 9.7 pounds. The average particle size of the product was 50 microns. The product was analyzed and determined to be 91% APAA. The actual yield of APAA was 90% of theoretical, based on the starting weight of aspartic acid. The mixing energy provided to the fluid bed dryer wa 8.98 hp per hour, based on the reaction time of three and one-half hours. Based on the 130 liter total capacity of fluid bed dryer, the horsepower per hour per liter volume was 0.069.

EXAMPLE 3

L-aspartic acid (108 lbs.) was placed in the fluid bed dryer described in Example 1. The jacket was preheated to 260° C. (500° F.). The fluid bed dryer was equipped with an agitator a s described in Example 1 and a chopper as described in Example 2. The agitator speed was maintained at 122 rpm and the chopper was run at ¾ power. The product temperature was measured to be 204° C. (400° F.), and the reaction temperature was maintained at 223° C. (434° F.) to 229° C. (444° F.) throughout the reaction. A nitrogen atmosphere was maintained in the dryer during the reaction.

The total reaction time was three and one-half hours after which 85 pounds of product was recovered from the dryer. No product was recovered from the filter. The condensate weight was 17.2 pounds. The average particle size of the product was 50 microns. The product was analyzed and determined to be 69% APAA. The yield was 73% of theoretical, based on the weight of aspartic acid. The agitation energy provided was 5.88 hp per hour, based on a three and one-half hour reaction time. The horsepower per hour per liter of total dryer capacity was 0.045.

EXAMPLE 4

L-aspartic acid (110.5 lbs.) in solid, particulate form was introduced into a fluid bed dryer equipped with an agitator as described in Example 1 and a chopper as described in Example 2. The agitator speed was maintained at 122 rpm and the chopper was run at full power. The jacket was preheated to 246° C. (475° F.) and a nitrogen atmosphere was provided. The reaction temperature was maintained at 222° to 223° C. (431° to 434° F.) throughout the reaction, while the product temperature was maintained at 204° C. (400° F.). The total reaction time was six hours and two minutes.

The product recovered from the fluid bed dryer weighed 8 pounds and the product recovered from the filter weighed 2 pounds. The weight of the condensate was 18.4 pounds. The average particle size of the product was 50 microns. The product was analyzed and determined to be 91% APAA. The actual yield of APAA was 95% of theoretical, based on the starting weight of aspartic acid. Based on the reaction time, the agitation energy provided was 12.38 hp per hour. The horsepower per hour per liter of dryer capacity was 0.095.

The following Tables I and II summarize the results obtained from the above examples.

TABLE I

| SUMMARY OF PRODUCT RESULTS | | | | |
| --- | --- | --- | --- | --- |
| Example | 1 | 2 | 3 | 4 |
| L-aspartic Acid, lbs | 110.5 | 110.5 | 108 | 110.5 |
| Theoretical Yield of APAA, lbs. | 81.8 | 81.8 | 79.9 | 81.8 |
| Degree of Polymerization of Aspartic Acid, % | 74 | 91 | 69 | 91 |
| Actual Weight of Solid Product Recovered from Process, lbs. | 93 | 81.3 | 85 | 85 |
| Actual Yield of APAA, lbs. | 68.8 | 74.0 | 58.7 | 77.3 |
| Yield of APAA, % Theoretical Yield | 84 | 90 | 73 | 95 |

TABLE II

| AGITATION ENERGY PROVIDED | | | | |
| --- | --- | --- | --- | --- |
| Example | 1 | 2 | 3 | 4 |
| Reaction Temp., °C. | 223 | 222 | 223 | 223 |
| Reaction Time, Hrs. | 3 | 3.5 | 3.5 | 3.5 |
| Mixing Energy Provided hp/hr | 2.35 | 8.98 | 5.98 | 12.38 |
| Yield of APAA % of Theoretical Yield | 84 | 90 | 73 | 95 |

EXAMPLE 5

The APAA obtained from any of the previous examples is hydrolyzed using alkaline hydrolysis to produce PAA. To hydrolyze 1000 pounds of APAA, water (300 gal.) and a solution that is 50% by weight sodium hydroxide (NaOH) (60 gal.) were mixed together for about five minutes. APAA (1000 lbs.) was then added to the solution. The APAA was mixed with the solution for about 30 minutes. Water (100 gal.) was then added to the mixture. The pH of the mixture was then adjusted to 9.0 to 9.5, using a solution of 50% NaOH (approximately 11 gal.). The solution was mixed until a clear solution was obtained. The resulting PAA solution was then cooled to 50° C. (122° F.).

It would be apparent to one skilled in the art that the foregoing illustrations are subject to numerous modifications which do not depart from the spirit and scope of this invention. The invention herein disclosed is therefore not to be construed as limited except as recited in the claims hereinbelow.

I claim:

1. A method for producing a anhydropolyamino acid in relatively high yields comprising the steps of:
   a.) providing an agitated, fluid bed constituted by freely flowing, solid, particulate, alpha amino acid;
   b.) heating the fluid bed to a temperature of at least about 180° C. (356° F.) and maintaining the heated bed at a temperature in the range of about 180° C. (356° F.) to about 250° C. (482° F.) for a time period sufficient to polymerize the alpha amino acid and to drive off water from the heated bed while maintaining the mean bed particle size and a value of no more than about 150 microns and while providing a degree of agitation sufficient to maintain the particles in a substantially free-flowing state throughout the time period; and
   c.) recovering anhydropolyamino acid from the fluid bed.

2. The method of claim 1 wherein the alpha amino acid is L-aspartic acid.

3. The method of claim 1 further comprising hydrolyzing the recovered anhydropolyamino acid to produce a polyamino acid.

4. The method of claim 3 wherein the recovered anhydropolyamino acid is hydrolyzed by alkaline hydrolysis.

5. The method of claim 1 wherein the fluid bed is vented to allow the water to escape therefrom.

6. The method of claim 5 further comprising recovering the water.

7. The method of claim 1 further comprising providing a nitrogen atmosphere to the fluid bed.

8. The method of claim 1 wherein the degree of agitation is at least about 0.015 horsepower per hour per liter of fluid bed volume.

* * * * *